United States Patent

[11] 3,538,950

| [72] | Inventor | Wilhelm L. Porteners<br>Pontiac, Michigan |
|---|---|---|
| [21] | Appl. No. | 816,739 |
| [22] | Filed | April 16, 1969 |
| [45] | Patented | Nov. 10, 1970 |
| [73] | Assignee | Locking Devices, Inc.<br>Pontiac, Michigan<br>a corporation of Michigan |

[54] QUICK CONNECT LUGGED COUPLING
14 Claims, 9 Drawing Figs.

[52] U.S. Cl. .................................................. 137/608,
251/149.6, 285/376
[51] Int. Cl. ...................................................... F16l 37/28
[50] Field of Search ............................................ 251/149.1,
149.6; 137/608; 285/(Con.), 209, 210, 360, 376, 396, 401

[56] References Cited
UNITED STATES PATENTS

| 778,936 | 1/1905 | Witmond...................... | 285/360 |
| 3,170,667 | 2/1965 | Szohatzky .................... | 251/149.6 |

FOREIGN PATENTS

| 928,633 | 6/1963 | Great Britain................ | 285/401 |

*Primary Examiner*—William R. Cline
*Attorney*—Whittemore, Hulbert and Belknap

ABSTRACT: A coupling including male and female elements which are secured together my means of lugs on the male element which extend through notches to be received in a groove in the female element. An interior surface of the groove is provided with protuberances which assure proper rotation of the elements when engaged and provide a stop for the lugs. A spring biased valve is provided for normally closing the female element to the passage of fluid. The coupling is integrated into a panel forming part of a fluid manifold.

INVENTOR.
WILHELM L. PORTENERS

ATTORNEYS

Patented Nov. 10, 1970

INVENTOR.
WILHELM L. PORTENERS

BY
*Littemore Hulbert & Belknap*

ATTORNEYS

QUICK CONNECT LUGGED COUPLING

BACKGROUND OF THE INVENTION

Couplings of the type to which the present invention is directed are utilized for a variety of purposes. The coupling is particularly directed to uses where it is desired to have a quick connect and disconnect. For example, in pneumatic or hydraulic control systems, it is frequently desired to change the control line. The control lines may be connected to a board forming part of a central source of fluid under pressure. In the past, threaded fastener devices have frequently been used for such applications. When a large number of connections are made, the time consumed in threading the connector into and out of the board has been lengthy. Additionally, threaded openings always present a problem in connection with sealing the connection fluid-tight.

A similar problem exists in connection with electrical connections. Jacks have been commonly used in the past. However, jacks do not provide a locked connection and a connection made by use of a jack may inadvertently be opened.

The present invention provides a coupling which is capable of being quickly connected in secure, fluid-tight engagement. The coupling is capable of integration into a service board forming part of a manifold fluid supply structure. The coupling is relatively uncomplicated and capable of low cost manufacture.

SUMMARY OF THE INVENTION

The coupling comprises a male element and a female element. The male element includes a body having at least one lug extending laterally therefrom. The female element comprises a body having an opening including a notch configured to receive one end of the male element with the lug received in the notch. The female body has a groove therein adjacent to said opening and of larger diameter than the opening. The groove and opening define a lip. A first protuberance is provided on the inner side of the lip adjacent to the notch. A second protuberance is provided on the inner side of the lip spaced from the first protuberance on the side opposite the notch. The first protuberance extends into the groove a distance sufficient to make pressure contact with the lug but permits passage of the lug thereby upon insertion of the male element into the female element and relative turning of the element. The second protuberance extends into the groove a distance sufficient to act as a stop when contacted by the lug. A third protuberance may be provided on the side of the notch opposite from the first protuberance to act as a stop to prevent turning of the elements in the wrong direction.

IN THE DRAWINGS

Figure 1:
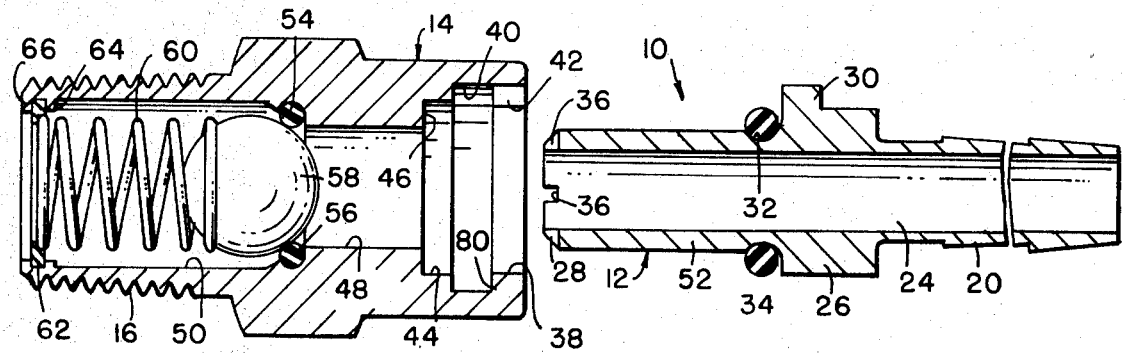
FIG. 1 is a sectional view of a coupling forming one embodiment of the present invention with the parts separated from each other in open position.
Figure 4:
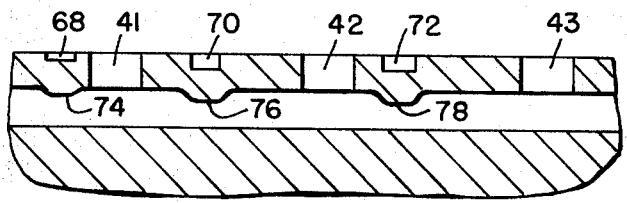
FIG. 4 is a sectional view taken substantially along the line 4—4 of FIG. 2 looking in the direction of the arrows and illustrating the forward portion of the female member laid out flat.
Figure 5:
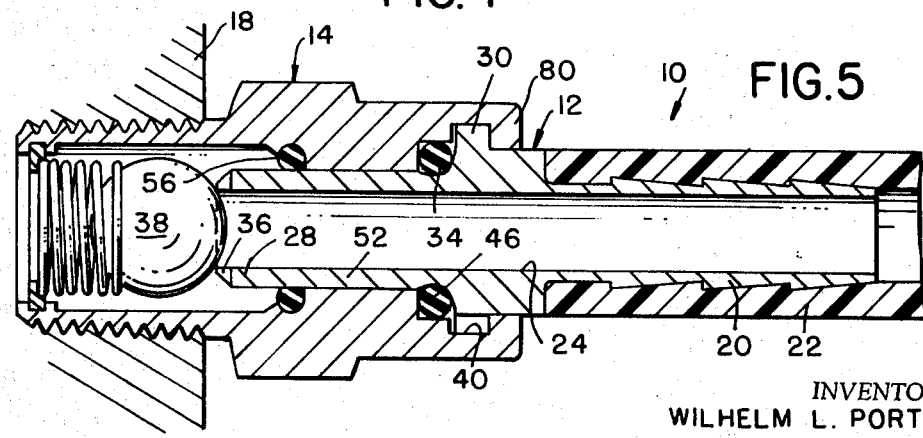
FIG. 5 is a sectional view of the coupling of FIG. 1 illustrated in the closed and locked position.

Referring to FIGS. 1—5, the coupling generally indicated at 10 comprises a male element 12 and a female element 14. These members have an uncoupled position as illustrated in FIG. 1 wherein they are separated and a coupled position as illustrated in FIG. 5 wherein they are locked together. One end 16 of the female element 14 is externally threaded for reception into a threaded opening of a support structure 18 forming part of, for example, an air supply manifold. The end 20 of the male element 12 is serrated to lockingly receive a flexible air line 22 as shown in FIG. 5. As will be appreciated, the configuration of the ends of the male and female elements may be altered as desired for connection to other structure. For example, the coupling structure may be used for hydraulic connections, electrical connections, and mechanical connections.

The male element 12 comprises an elongated tubular body defining a central bore 24 for the flow of air. An enlarged portion 26 is provided intermediate the ends 20, 28. A plurality of lugs 30, illustratively three in number, project radially outwardly from the enlarged portion 26 and are positioned at the forward end thereof. The lugs 30 are equally spaced around the periphery of the enlarged portion 26. An annular groove 32 is provided immediately forwardly of the enlarged portion 26. An O-ring 34 is received on the male element 12 and seated in the groove 32.

The forward end 28 of the male element 12 is tapered radially inwardly. A plurality of slots 36, illustratively four in number, are provided in the forward end 28 equally spaced around the periphery thereof.

The female element 14 also comprises a tubular body defining a central bore for the flow of air therethrough. The bore is divided into several sections. The first section comprises an opening 38 substantially equal in diameter to the diameter of the enlarged portion 26 of the male element to snugly receive this element when the parts are coupled. An enlarged groove 40 is provided immediately adjacent to the opening 38. The diameter of the groove 40 is larger than the diameter of the opening 38 by an amount equal to twice the length of one of the lugs 30.

A plurality of spaced apart notches 41, 42, 43 extend radially outwardly from the opening 38. The notches are of a size and are so positioned to permit entry of the lugs 30 through the opening 38 and into the groove 40. A recess 44 of a diameter the same as O-ring 34 is provided adjacent to the groove. The recess 44 defines an annular shoulder 46 against which the O-ring 34 seats in sealing engagement therewith when the elements are coupled together.

A bore portion 48 extends rearwardly from the recess 44 to an enlarged bore portion 50 which extends to the rear of the female element 14. The bore portion 48 has a diameter substantially equal to the diameter of the forward portion 52 of the male element. A groove 54 is provided immediately adjacent to the bore portion 48. An O-ring 56 is seated in the groove 54.

A check valve assembly is provided in the bore portion 50. This assembly comprises a metal ball 58 and a coil spring 60 which constantly urges the ball 58 to seat on the O-ring 56 thus normally closing the female element 14 to the passage of air. The spring 60 is mounted, at its rearward end, in a retaining ring 62. Interior lugs 64 and crimped-over portion 66 secure the ring 62 in place.

Figure 2:
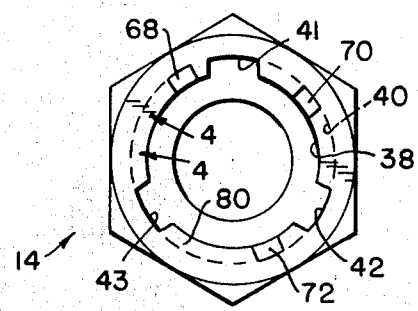
FIG. 2 is an end view of the female coupling element of FIG. 1 viewed from the right.
Figure 3:
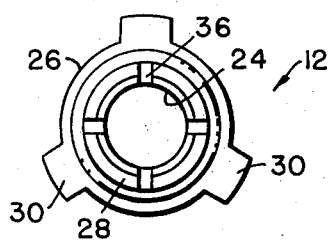
FIG. 3 is an end view of the male coupling element of FIG. 1 viewed from the left.

Referring to FIGS. 2 and 4, it will be noted that three indentations 68, 72, 72 are formed in the forward end of the female element 14. The indentations, which may, for example, be formed by means of a suitable punch, cause protuberances 74, 76, 78 on the underside of the lip 80 defined by the groove 40. The indentations extend only for the width of the lip to result in the formation of the protuberances. The first protuberance 74 is formed immediately to the left on the counterclockwise side of the notch 41. It will be noted that the indentation 68 is not as deep as the indentations 70, 72 with the result that the protuberance 74 does not extend into the groove 40 as far as the protuberances 76, 78 do. The lugs 30 are slightly less in thickness than the depth of the groove 40.

This permits the lug 30 adjacent to the protuberance 74 to pass over this protuberance in pressure contact therewith.

The protuberance 76 is positioned intermediate the notches 41, 42. The protuberance 76 extends far enough into the groove 40 to act as a stop to the lug 30. The protuberance 78 is provided immediately adjacent to the notch 42 on the clockwise side. This protuberance prevents the male element 12 from being turned in the clockwise direction.

Operation of the coupling may now be understood. When it is wished to connect the male element 12 to the female element 14, the forward portion 52 of the male element is aligned with the bore of the female element. The male element is inserted into the female element and is turned so that the lugs 30 are aligned with the notches 41, 42, 43. The male element is then further inserted until the lugs 30 are received in the groove 40. The male element is then turned in the counterclockwise direction. As previously noted, it may not be turned in the clockwise direction because of the presence of the protuberance 78. After a lug 30 has passed over the protuberance 74, further turning of the male element will cause the lug to contact the protuberance 76 and prevent further rotation of the male element. The presence of the protuberance 74 will prevent inadvertent turning of the male element 12 in the clockwise direction so as to disengage the coupling. The O-ring 34 functions as a spring, pressing the lugs against the lip 80. It requires a positive turning effort to force the lug past the protuberance 74. Additionally, the pressure of the air which flows through the coupling drives the lugs 30 against the lip 80 thus causing positive contact with the lug and protuberance 74. Consequently, the coupling will not become disengaged as a result of vibration during use.

When the male element 12 is inserted into the female element, the forward end 28 contacts the ball 38 and drives the ball away from the O-ring 56 thus opening the female element 14 for the passage of air therethrough. The slots 36 in the forward end 28 permit air to flow around the ball 38 and into the bore 24 of the male element. The juncture of the male and female elements is sealed tight as the result of pressure contact between the O-ring 34 and shoulder 46.

Figure 6:
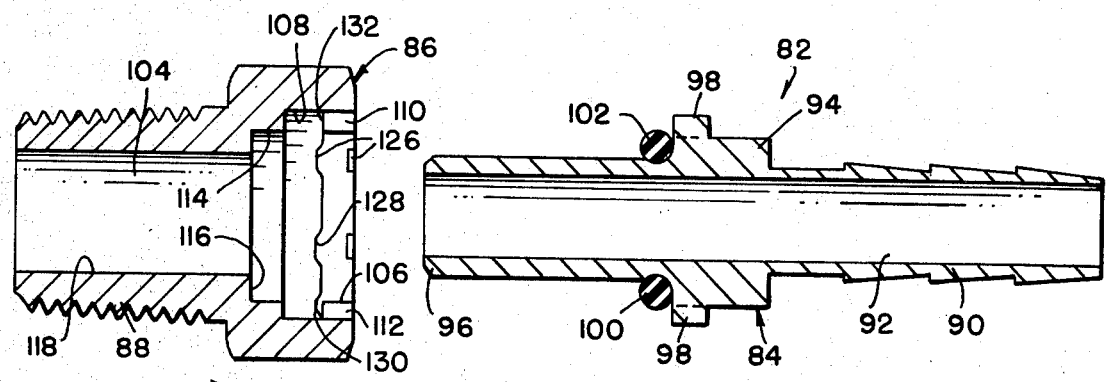
FIG. 6 is a sectional view of a coupling forming another embodiment of the present invention with the parts separated from each other in open position.
Figure 7:
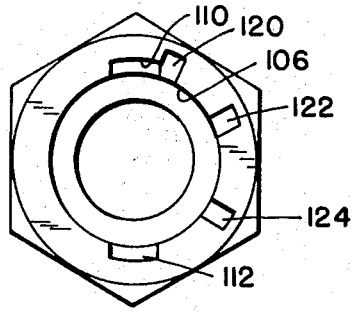
FIG. 7 is an end view of the female coupling element of FIG. 6 viewed from the right.

FIGS. 6 and 7 illustrate a modified embodiment of the coupling. The coupling 82 comprises a male element 84 and a female element 86. One end 88 of the female element 86 is externally threaded for reception into a threaded opening of a support structure. The end 90 of the male element 84 is serrated to lockingly receive a flexible air line.

The male element 84 comprises an elongated tubular body defining a central bore 92 for the flow of air. An enlarged portion 94 is provided intermediate the ends 90, 96. A plurality of lugs 98, illustratively two in number, project radially outwardly from the enlarged portion 94 and are positioned at the forward end thereof. The lugs 98 are located diametrically opposite each other. An annular groove 100 is provided immediately forwardly of the enlarged portion 94. An O-ring 102 is received on the male element 84 and seated in the groove 100. The forward end 96 of the male element 84 is tapered radially inwardly.

The female element 86 also comprises a tubular body defining a central bore 104 for the flow of air therethrough. The bore 104 is divided into several sections. The first section comprises an opening 106 substantially equal in diameter to the diameter of the enlarged portion 94 of the male element to snugly receive this element when the parts are coupled. An enlarged groove 108 is provided immediately adjacent to the opening 106. The diameter of the groove 108 is larger than the diameter of the opening 106 by an amount equal to twice the length of one of the lugs 98.

Two spaced apart notches 110, 112 extend radially outwardly from the opening 106. The notches are positioned diametrically opposite each other to permit entry of the lugs 98 through the opening 106 and into the groove 108. A recess 114 of a diameter the same as the O-ring 102 is provided adjacent to the groove. The recess 114 defines an annular shoulder 116 against which the O-ring 102 seats in sealing engagement therewith when the elements are coupled together.

A bore portion 118 extends rearwardly from the recess 114 to the rear end of the female element 86. The bore portion 118 has a diameter substantially equal to the forward end portion 96 of the male element.

Three indentations 120, 122, 124 are formed in the forward end of the female element 86. The indentations cause protuberances 126, 128, 130 on the underside of the lip 132 defined by the groove 108. The first protuberance 126 is formed immediately to the right on the clockwise side of the notch 110. The other two protuberances 128, 130 are provided in spaced apart relationship between the notches 110, 112.

The protuberance 126 extends sufficiently into the groove 108 to act as a stop for the lug 98. This protuberance prevents the male element 84 from being turned in the clockwise direction.

It will be noted that the indentation 124 is not as deep as the indentations 120, 122 with the result that the protuberance 130 does not extend into the groove 108 as far as the protuberances 126, 128 do. The lugs 98 are slightly less in thickness than the depth of the groove 108. This permits a lug 98 to pass over the protuberance 130 in pressure contact therewith.

Operation of the coupling may now be understood. When it is wished to connect the male element 84 to the female element 86, the forward end portion 96 of the male element is aligned with the bore 104 of the female element. The male element is inserted into the female element and is turned so that the lugs 98 are aligned with the notches 110, 112. The male element is then further inserted until the lugs 98 are received in the groove 108. The male element is then turned in the counterclockwise direction. As previously noted, it may not be turned in the clockwise direction because of the presence of protuberance 126. After a lug 98 has passed over the protuberance 130, further turning of the male element will cause the lug to contact the protuberance 128 and prevent further rotation of the male element. The presence of protuberance 130 will prevent inadvertent turning of the male element as previously described in connection with FIG. 1. Full insertion of the male element causes the O-ring 102 to contact the shoulder 116 in sealing engagement therewith and also urge the lugs against the lip 132.

Figure 8:
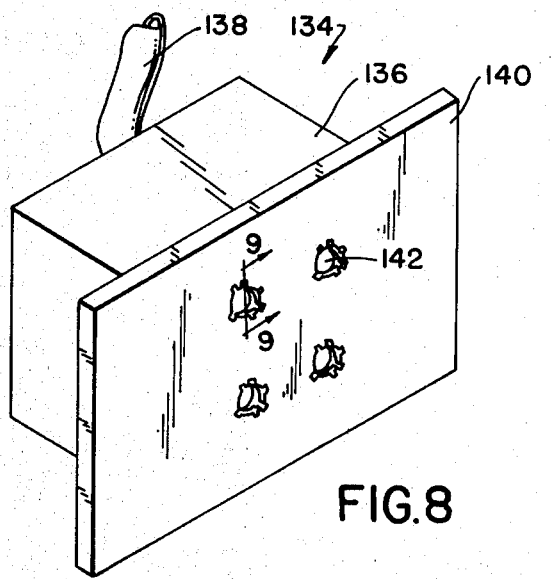
FIG. 8 is a view in perspective of an air supply manifold structure with female coupling elements of FIG. 1 integrated thereinto.
Figure 9:
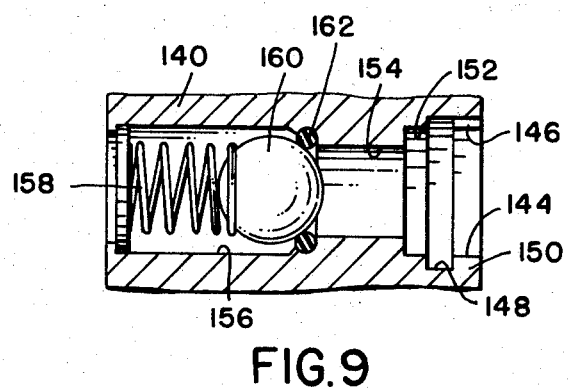
FIG. 9 is a sectional view taken substantially along the line 9—9 of FIG. 8 looking in the direction of the arrows.

FIGS. 8 and 9 illustrate a manifold structure 134 utilized as a source of air under pressure. The manifold structure includes a boxlike member 136 which defines a chamber serving as a reservoir. Air is supplied to the chamber by means of a conduit 138 which is connected to, for example, an air compressor.

A panel 140 forms the front wall of the boxlike member 136. A plurality of openings 142 are provided in the panel 140.

As shown in FIG. 9 each of the openings 142 is configured as a bore which is identical to the bore of the female element described in connection with FIG. 1. It will be noted that the bore comprises an opening 144 having notches 146 to receive the lugs of the male element 12. A groove 148 is provided behind the opening 144. Protuberances are formed on the interior surface of the lip 150 as previously described. The groove 148 is followed by a recess 152 and bore sections 154, 156 which result in communication with the interior of the boxlike member 136. A check valve assembly comprising a spring 158, ball 160 and O-ring 162, is provided to normally maintain the opening 142 closed.

As will be appreciated, the structure thus described will receive the male element 12 in the fashion described in connection with FIGS. 1—5. The number of openings 142 may be varied in accordance with the needs of the particular application. The use of the coupling structure in the fashion of FIGS. 8 and 9 results in permitting the making or breaking of pneumatic connections in a control system or the like rapidly and efficiently and with considerable variation in the circuitry of the pneumatic system.

I claim:

1. A coupling comprising a male element and a female element, the male element comprising a body having at least one lug extending laterally therefrom, the female element comprising a body having an opening including a notch configured to receive one end of the male element with the lug received in the notch, said female body having a groove therein adjacent to said opening and of larger diameter than said opening, said groove and opening defining a lip, a first protuberance on the inner side of said lip adjacent to said notch, a second protuberance on the inner side of said lip spaced from the first protuberance on the side opposite the notch, said first protuberance extending into the groove a distance sufficient to make pressure contact with the lug but permit passage of the lug thereby upon insertion of the male element into the female element and relative turning of said elements, said second protuberance extending into the groove a distance sufficient to act as a stop when contacted by the lug.

2. A coupling as defined in claim 1, and further characterized in the provision of a third protuberance on the inner side of said lip adjacent to said notch on the side opposite of the first protuberance, said third protuberance extending into the groove a distance sufficient to act as a stop when contacted by the lug to prevent relative turning of the male and female elements in the wrong direction.

3. A coupling as defined in claim 1, and further characterized in the provision of at least three notches in said opening, said male element having at least three lugs located thereon for alignment with the notches in the female element.

4. A coupling as defined in claim 3, and further characterized in that said first protuberance is provided adjacent to one of said notches, said second protuberance being provided intermediate a pair of said notches but not adjacent to said first protuberance whereby the protuberances will be contacted by different lugs of the male element.

5. A coupling as defined in claim 1, and further characterized in the provision of two notches in said opening positioned diametrically opposite each other and said male element having a pair of diametrically opposed lugs for alignment with the notches in the female element.

6. A coupling as defined in claim 5, and further characterized in that said second protuberance is located between said first protuberance and the other notch.

7. A coupling as defined in claim 1, and further characterized in that said male and female elements each have a bore therethrough for fluid flow, said male and female elements each having means thereon for connection to a fluid line.

8. A coupling as defined in claim 7, and further characterized in the provision of sealing means on one of the male and female elements to result in a fluid-tight connection when the elements are coupled together.

9. A coupling as defined in claim 7, and further characterized in the provision of a forward extension on the male element, a check valve in the female element normally maintaining the female element closed to the passage of fluid, said extension on the male element being operative to cause opening of the check valve upon coupling of the elements together to thereby permit fluid flow therethrough.

10. A coupling as defined in claim 7, and further characterized in that said male element has an enlarged portion intermediate the ends thereof, said lug being formed on said enlarged portion, said opening in the female member being of substantially the same diameter as said enlarged portion whereby the enlarged portion is received therein to firmly seat the male element in the female element when said elements are coupled together.

11. A coupling as defined in claim 10, and further characterized in the provision of an O-ring on the male element immediately forwardly of said enlarged portion, and a shoulder formed in said female element for abutment with said O-ring when the elements are coupled together to provide a fluid-tight connection.

12. A coupling as defined in claim 1, and further characterized in that said protuberances are formed by indentations formed on the outer side of said lip.

13. A coupling as defined in claim 1, and further characterized in that the thickness of said lug is less than the depth of said groove in order to facilitate movement of the lug past said first protuberance, and resilient spring means on one of said male and female elements to urge said elements apart after coupling thereof whereby said lug will fully contact said first protuberance upon turning of the elements in a direction to disconnect the coupling elements.

14. The combination comprising a manifold structure forming a reservoir for air under pressure, means to supply said manifold structure with air under pressure, said manifold structure including a panel having a plurality of bores formed therein, said bores being provided to receive male elements each comprising a body having at least one lug extending laterally therefrom and a bore therethrough for the passage of air, said opening including a notch configured to receive one end of the male element with the lug received in the notch, said bores each having a groove therein adjacent to said opening and of larger diameter than said opening, said grooves and openings each defining a lip, a first protuberance on the inner side of each of said lips adjacent to said notch, a second protuberance on the inner side of each of said lips spaced from the first protuberance on the side opposite the notch, each of said first protuberances extending into the groove a distance sufficient to make pressure contact with the lug of a male element but permit passage of the lug thereby upon insertion of the male element into the female element and turning of the male element, each of said second protuberances extending into the groove a distance sufficient to act as a stop when contacted by the lug of a male element, check valve means within each of said bores to normally close the bores to the passage of air, said check valve means being biased to the open position upon insertion of the male element.